Sept. 17, 1946.                O. E. ESVAL                2,407,657
                          TRANSFORMER PICK-OFF
                          Filed Oct. 24, 1942
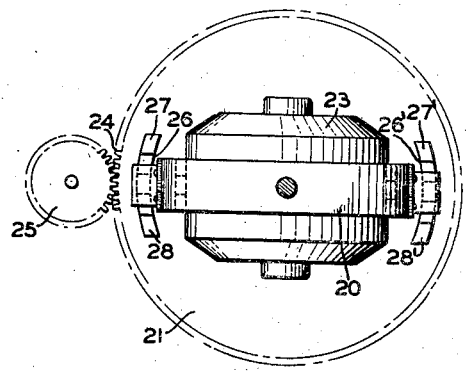
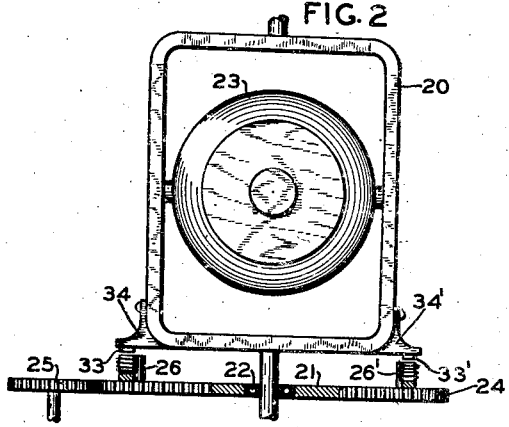
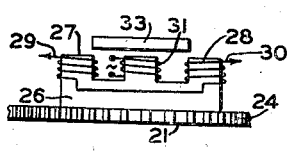
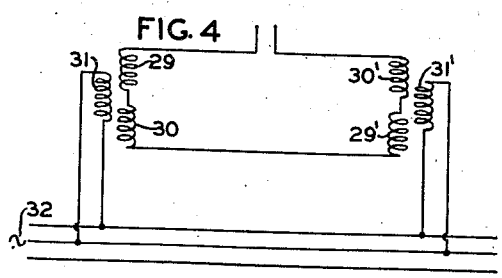
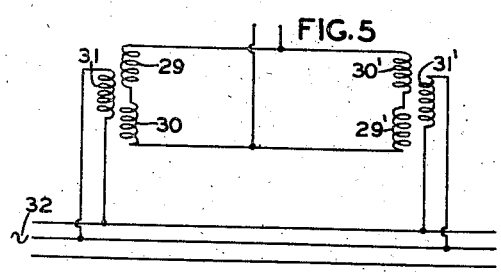
INVENTOR
BY O. E. ESVAL
H. H. Thompson
ATTORNEY Patented Sept. 17, 1946

2,407,657

UNITED STATES PATENT OFFICE 2,407,657

TRANSFORMER PICK-OFF

Orland E. Esval, Huntington, N. Y., assignor to Sperry Gyroscope Company, Inc., Brooklyn, N. Y., a corporation of New York Application October 24, 1942, Serial No. 463,286

3 Claims. (Cl. 177—380)

This invention relates to a pick off of the transformer type which generates a signal responsive to the displacement of two relatively movable objects. The improved pick off is particularly adapted to produce a signal that is approximately proportional to the angular displacement of two relatively rotatable objects.

One of the features of the present invention resides in the combination of a pair of transformer pick offs with the coils of the same connected in counterbalancing relation to cancel the respective signals induced therein due to relative movement between the movable objects in a direction transverse to the direction in which displacement occurs.

Other features and structural details of the invention will be apparent from the following description when read in relation to the accompanying drawing, wherein Fig. 1 is a plan view showing the relative positions of a pair of transformer pick offs arranged in accordance with the teaching of the present invention as utilized with a directional gyro instrument.

Fig. 2 is an elevational view of the pick off illustrated in Fig. 1.

Fig. 3 is an enlarged detail side elevation of one of the pick off units shown in the two previous figures.

Figs. 4 and 5 are circuit diagrams showing series and parallel connections of the respective secondary coils of the pair of pick offs arranged in accordance with the present inventive concepts.

With particular reference to Figs. 1 to 5 inclusive, the pair of transformer type pick offs illustrated therein are mounted in diametrically spaced relation to provide a signal proportional to the angular displacement of two relatively movable objects which, in this instance, are shown in the form of the vertical ring 20 of a gyro instrument of the direction indicating type and a table 21. Ring 20 and table 21 are coaxially mounted, the ring being mounted for movement by means of suitable bearings (not shown), and the table 21 being rotatably positioned relatively thereto by means of bearing 22. These objects are angularly displaceable about their common axis and the pick offs employed are utilized to obtain a signal which is approximately proportional to the displacement thereof from an oriented position. The combination of the two pick offs provided in this instance cancels any signal on the output circuit which is due to relative movement between the movable objects in a direction transverse to the direction in which displacement occurs which as herein illustrated is in a radial direction and is due to looseness in the bearing 22.

The rotor bearing case of the gyro instrument which is mounted in a conventional manner in the ring 20 is indicated at 23. The table 21 is circular in form and may include a peripheral gear 24 which meshes with a pinion 25. Pinion 25 may be driven in a suitable manner known in the art by a follow up motor (not shown) which operates responsive to the signal of the pick off to turn the table to an oriented position with relation to the vertical ring of the gyro instrument. The transformer pick offs include core members each of which provides two separate open magnetic circuits. The cores of the respective pick offs are indicated at 26 and 26', the same in this instance being shown as mounted for movement with the table 21 and disposed in diametrically spaced relation thereon. Each of the cores is of the three legged type and the outside legs 27 and 28 thereof, Fig. 3, have coils 29 and 30 wound around the same to provide an output circuit. The coils 29 and 30 link the respective magnet circuits provided and are connected in opposition to produce an output signal that is phase sensitive to the sense of relative displacement of the objects. The core 26' of the other pick off is similarly constructed and the coils 29' and 30' thereof as shown in Figs. 4 and 5 are also connected in opposition. Further the respective coils of the paired cores are connected in counterbalancing relation to cancel any signal in the provided single output circuit due to radial movement between the two relatively rotatable objects. As shown in Fig. 4, the coils are connected in series. In Fig. 5, the secondary or output coils of the paired transformer pick offs are connected in parallel.

The central leg of each of the transformer cores 26 and 26' is provided with its individual coil or winding 31, 31' supplied with energy from a suitable alternating current energy source such as indicated at 32. The armatures of the respective paired pick offs are indicated at 33 and 33' and are suitably mounted in spaced relation on lugs 34 and 34' respectively which are connected to the base portion of the oppositely disposed legs of the vertical ring 20. Consequently, the respective armatures are diametrically spaced and arranged to differentially change the openings between the outside legs and central legs of the cores. The oriented position of the rotatable objects in relation to the parts of the pick offs thereon is shown in Fig. 3 in which the armature is equidistant from both of the outside legs of the respective cores. The armatures and cores are arranged in axially separated, radially-overlapping relation.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A transformer pick off producing a signal substantially proportional to the angular displacement of two relatively rotatable objects comprising a pair of magnetic cores mounted in diametrically spaced relation for movement with one of the objects each of which provides two separate open magnetic circuits, means for supplying an alternating m. m. f. to each of said circuits, a pair of permeable armatures having portions radially overlapping portions of said cores and mounted for movement with the other of the rotatable objects to differentially change the openings in the provided separate magnetic circuits, an output coil linking each of the magnetic circuits, means for connecting the coils of each core in opposition to produce an output signal that is phase sensitive to the sense of relative displacement of the objects, and means for connecting the coils of both cores in counterbalancing relation to cancel the respective signals induced therein due to radial movement between the two relatively rotatable objects.

2. Transformer pick-off means adapted to derive a signal as a function of the relative motion between a stationary member and movable member mounted for motion about an axis relative to said stationary member, said pick-off means comprising units located diametrally of said axis, each of said units comprising coil means and armature means mounted in axially separated radially-overlapping relation on said respective members for relative movement between said coil means and said armature means, each unit also including means for inducing a signal in each of said coil means as a function of said displacement, said diametrally disposed coil means being connected in opposition to compensate for motion between said members transversely of said axis.

3. Transformer pick-off means adapted to derive a signal as a function of the relative motion between a stationary member and movable member mounted for motion about an axis relative to said stationary member, said pick-off means comprising units disposed diametrally of said axis, each of said units comprising a core on said stationary member having spaced secondary coils thereon in phase opposition, an energizing coil on said core, and an armature on said movable member axially displaced from said core to provide an air gap through which magnetic lines may extend substantially axially between said core and said armature, said armature being pivotable relative to said core to vary the reluctance of the paths coupling each energizing coil and its respective secondary coils, the secondary coils of each unit being connected in phase opposition to produce a signal proportional to the difference of their respective signals, the terminals of opposite units likewise being connected in opposition to compensate such difference signal for relative movement of said members transverse of said axis.

ORLAND E. ESVAL.